Patented Nov. 7, 1944

2,362,166

UNITED STATES PATENT OFFICE 2,362,166

METHOD OF COATING

John K. Speicher, Newark, N. J., assignor to Hercules Powder Company, Wilmington, Del., a corporation of Delaware No Drawing. Application October 16, 1942, Serial No. 462,291

4 Claims. (Cl. 117—46)

This invention relates to a method for the application of protective coatings of ethyl cellulose compositions and more particularly to the application of protective coatings of ethyl cellulose compositions by spraying the compositions through a flame.

Ethyl cellulose compositions have highly desirable properties as protective coatings. The coatings are tough, flexible, resistant to checking, heat resistant, alkali resistant, and electrical insulating. There are several standard methods of applying ethyl cellulose compositions as protective coatings such as in the form of a lacquer solution, water emulsions, etc. The most desirable of these is lacquer solution which uses large amounts of volatile solvents. The use of these solvents involves inherent disadvantages, the principal one of which is the high cost. The solvent is almost invariably lost because solvent recovery systems are costly and can only be installed under favorable conditions where enormous quantities of lacquer are being applied. Other disadvantages include the fire hazard involved when volatile solvents are employed and the difficulty of removing volatile solvents from applied films. It is practically impossible to completely remove all volatile solvent and there are some uses of protective coatings in which even minute traces of solvents are objectionable; protective coatings on food containers are typical. Hot spray methods have been used, utilizing high solids lacquers, but some solvent is used therein and the difficulty of a perfect drying remains unsolved.

It is desirable, therefore, to provide a method whereby ethyl cellulose compositions may be applied as protective coatings without the use of any solvent.

Now, in accordance with the present invention, an ethyl cellulose protective coating composition is sprayed directly onto the surface to be coated without the use of any solvent. This is accomplished by passing the dry, finely ground ethyl cellulose composition rapidly through a flame which melts it, and the melted ethyl cellulose compositions sprayed on the object to be coated by compressed air or other propelling means where it cools and adheres as a coating. The apparatus which may be used for this process is described in the U. S. patents to Schori; Re. 20,425 and 2,108,998. Compositions of ethyl cellulose used include plasticizers and resins. These particular compositions, which will be hereinafter more fully described, are capable of being finely ground, of melting at a temperature at which they will not burn, and adhering to the surface to be coated.

The following are examples of methods of carrying out the process:

Example 1

54.7 parts of ethyl cellulose having an ethoxyl content between 46.8 and 48.5% and having a viscosity of 100 seconds were colloided with 16.4 parts of triphenyl phosphate, 28.4 parts of Super-Beckacite 2000 (thermoplastic pure phenol-aldehyde resin), and 0.5 part of diphenylamine. The composition was granulated in a Wiley knife mill, made up into a water slurry and passed through a micropulverizer repeatedly until the material would pass a 150 mech screen. The Bakelite-Olson flow temperature of this material was 127° C. The composition was placed in the container of a Schori gun and melted by passing through the flame of the gun. The composition was used to coat a steel plate and gave a highly desirable coating which adhered well to the plate.

Example 2

58.5 parts of ethyl cellulose having an ethoxyl content between 46.8 and 48.5% and a viscosity of 100 seconds were colloided with 11.7 parts of dibutyl phthalate, 29.3 parts of Beckacite 1114 (ester gum modified with glyceryl maleate), and 0.5 part of diphenylamine. The colloided composition was granulated in a Wiley knife mill, made up into a water slurry and passed through a micropulverizer until the material had passed a 150 mesh screen. The Bakelite-Olson flow temperature of this material was 144° C. The composition was used to coat a steel plate by the use of a Schori gun and the coating was found to adhere well and have other desirable characteristics.

Example 3

52.4 parts of ethyl cellulose having an ethoxyl content between 46.8 and 48.5% and a viscosity of 100 seconds were colloided with 15.7 parts of triphenyl phosphate, 26.2 parts of Super-Beckacite 2000 (thermoplastic pure phenol-aldehyde resin), 0.5 part of diphenylamine, 2.6 parts of zinc oxide, and 2.6 parts of titanium dioxide. The Bakelite-Olson flow temperature of this material was 131° C. The composition was used to coat a steel plate by the use of a Schori gun and the coating was found to adhere well and have other desirable characteristics.

Example 4

55.5 parts of ethyl cellulose having an ethoxyl content of 46.8 to 48.5% and a viscosity of 100 seconds were colloided with 16.7 parts of dibutyl phthalate, 27.8 parts of Staybelite Ester 10 (hydrogenated ester gum modified with glyceryl maleate). The Bakelite-Olson flow temperature of this material was 127° C. The composition was dissolved in alcohol (10 to 15% solids in solution). The solution was mixed with a large quantity of water accompanied by vigorous agitation and the ethyl cellulose composition was thus precipitated in the form of powder. The powder was dried and used in a Schori gun to coat a steel plate to which the coating adhered well and had desirable characteristics.

Example 5

55.5 parts of ethyl cellulose having an ethoxyl content between 46.8 and 48.5% were colloided with 16.7 parts of dibutyl phthalate, 27.8 parts of Beckacite 1114 (ester gum modified with glyceryl maleate). The Bakelite-Olson flow temperature of this material was 132° C. The composition was dissolved in a 50–50 acetone-alcohol mixture (10 to 15% solids in solution) and the solution vigorously agitated with a large quantity of water whereby the ethyl cellulose composition was precipitated in the form of a fine powder. The powder was used in a Schori gun to coat a steel plate to which it adhered well and had other desirable characteristics.

Example 6

49.8 parts of ethyl cellulose having an ethoxyl content between 46.8 and 48.5% and a viscosity of 100 seconds were colloided with 9.9 parts of triphenyl phosphate, 39.8 parts of glycerol ester of hydrogenated rosin modified with a small amount of maleic anhydride, and 0.5 part of diphenylamine. The Bakelite-Olson flow temperature of this material was 129° C. The composition was used in a Schori gun to coat a steel plate and produce a coating which adhered well and had other desirable characteristics.

The ethyl cellulose composition used in the present invention comprises ethyl cellulose, a plasticizer therefor, and a compatible resin. The resin is not absolutely essential but is highly desirable particularly for the purpose of forming a better bond with the article to be coated. The percentage of the various ingredients may be varied but a composition having from 40 to 70% ethyl cellulose, from 10 to 30% of a plasticizer therefor, and from 0 to 40% of a compatible resin has been found most desirable.

Ethyl cellulose having an ethoxyl content between about 41% and about 51% can be used. Most desirable results have been obtained with the type of ethyl cellulose having an ethoxyl content between 46.8 and 48.5%. The viscosity grades of the ethyl cellulose may be varied but that having a viscosity above 20 centipoises is the most desirable because the higher viscosity material produces better flexibility and toughness. The viscosity is determined on a 5% solution in 80–20 toluene-alcohol of a sample dried 30 minutes at 100° C.

Various plasticizers for ethyl cellulose may be used, examples of which are triphenyl phosphate, dibutyl phthalate, diamyl phthalate, diphenyl phthalate, ethyl para-toluene sulfonamide, etc.

The compatible resins used may be varied but those having a melting point at or slightly below the desirable flow temperature of the composition (80 to 125° C.) are most desirable. These include wood rosin, thermoplastic pure phenolaldehyde resin (Super-Beckacite 2000), ester gum, ester gum modified with glyceryl maleate (Beckacite 1114), hydrogenated ester gum modified with glyceryl maleate (Staybelite Ester No. 10), etc.

Various other compounds may be used which would ordinarily be used in an ethyl cellulose composition such as filler, coloring matter, heat stabilizers, etc.

The size of the particles of the powdered material that is to be used in the Schori gun is of particular importance. A particle that is too large is difficult to spray evenly, tends to clog up the machine, and requires a high temperature to melt. A particle that is too small tends to form a mass which will not flow freely through the gun. For the purpose of this invention, it has been found most desirable to use ethyl cellulose composition in a particle size of from 100 to 200 mesh but preferably about 150 mesh. It is also important that particles of whatever size be substantially uniform. This is for the reason that if the flame is adjusted to a certain particle size it may fail to melt larger ones. It is desirable that the powder be a dry, free flowing powder. For that reason, it should be substantially free of any moisture, low melting constituents, or particularly adhesive materials.

While the invention is not limited thereby, two general methods have been found useful to obtain the proper particle size ethyl cellulose composition. In one method, the ethyl cellulose is colloided with the plasticizer and resin, for example, in the presence of a solvent in a Werner-Pfleiderer mixer. The solvent is removed by rolling on a heated two-roll mill. The composition is then reduced to smaller particles by the use of some grinding or cutting means such as a Wiley knife mill and the resulting granular powder is dried at, for example, 70° C. for 24 hours. The particles from the cutter are then mixed with sufficient water to form a slurry and the mixture passed through a micropulverizer repeatedly until the desired mesh size is obtained. This material is then recovered, dried, and screened to size.

The composition used should be one having a Bakelite-Olson flow temperature of between 110 and 150° C. The method used to check this temperature is in accordance with method D569–40T, dated June, 1940, of the American Society for Testing Materials, utilizing a working pressure of 100 pounds per square inch.

Thus, the present invention has described a process for forming a protective coating for the use of ethyl cellulose composition which is applied by passing it rapidly through a flame onto the surface to be coated. This method and composition give a protective coating which is tenaciously adhesive and which need not be dried since it contains no volatile solvent.

What I claim and desire to protect by Letters Patent is:

1. A method for coating ethyl cellulose without use of a solvent which comprises forming a composition having a Bakelite-Olson flow temperature of from about 110° to about 150° C. and containing from about 40% to about 70% of an ethyl cellulose having an ethoxyl content from about 41% to about 51% and from about 10% to about 30% of a compatible plasticizer, reducing said composition to a dry powder having a particle size from about 100 to about 200 mesh, projecting said powdered composition through a flame to melt the powder particles with substantially no decomposition thereof, and impinging said melted composition on a surface to form an adherent protective coating.

2. A method for coating ethyl cellulose without use of a solvent which comprises forming a composition having a Bakelite-Olson flow temperature of from about 110° to about 150° C. and containing from about 40% to about 70% of an ethyl cellulose having an ethoxyl content from about 41% to about 51%, from about 10% to about 30% of a compatible plasticizer, and up to about 40% of a compatible resin, reducing said composition to a dry powder having a particle size from about 100 to about 200 mesh, projecting said powdered composition through a flame to melt the powder particles with substantially no decomposition thereof, and impinging said melted composition on a surface to form an adherent protective coating.

3. A method for coating ethyl cellulose without use of a solvent which comprises forming a composition having a Bakelite-Olson flow temperature of from about 110° to about 150° C. and containing from about 40% to about 70% of an ethyl cellulose having an ethoxyl content from about 41% to about 51%, from about 10% to about 30% of a compatible plasticizer, and up to about 40% of a compatible resin, granulating said composition, further comminuting the composition by pulverizing the granules while immersed in water until the resulting pulverulent material has a particle size between about 100 and about 200 mesh, drying the pulverized composition, projecting said pulverized composition through a flame which melts the particles of the composition but which causes substantially no decomposition thereof, and impinging said melted particles on a surface to form an adherent protective coating.

4. A method for coating ethyl cellulose without use of a solvent which comprises forming a composition having a Bakelite-Olson flow temperature of about 144° C. and containing about 58.5 parts of an ethyl cellulose having an ethoxyl content of about 46.8 to 48.5% and a viscosity of about 100 seconds, about 11.7 parts dibutyl phthalate, and about 29.3 parts of glyceryl phthalate-modified ester gum, granulating the composition, pulverizing the composition in water suspension until the resulting pulverulent composition passes a 150-mesh screen, drying the resulting powder, projecting said powdered composition through a flame which melts the particles of the composition but which causes substantially no decomposition thereof, and impinging said melted particles on a surface to form an adherent protective coating.

JOHN K. SPEICHER.